(12) United States Patent
Bermel

(10) Patent No.: US 6,488,130 B1
(45) Date of Patent: Dec. 3, 2002

(54) TWIST-GRIP BRAKE FOR A CARGO PORTAGE DEVICE

(76) Inventor: John Karl Bermel, 11481 Anderson Springs Rd., Middletown, CA (US) 95461

( * ) Notice: Subject to any disclaimer, the term of this patent is extended or adjusted under 35 U.S.C. 154(b) by 0 days.

(21) Appl. No.: 09/852,558

(22) Filed: May 10, 2001

(51) Int. Cl.[7] .............................. B62L 1/00; B62B 1/18; B62B 5/04
(52) U.S. Cl. ..................... 188/19; 188/82.1; 188/2 D; 188/24.11; 188/24.18; 188/24.22; 188/265; 188/216; 188/77 R; 74/489; 74/506; 280/47.31
(58) Field of Search ...................... 188/19, 21, 22, 188/2 D, 24.11, 24.12, 24.18, 249, 259, 77 W, 77 R, 30, 82.1, 82.3, 82.34, 82.4, 82.5, 82.6, 82.7, 265, 24.22; 280/47.17, 47.31; 74/489, 506, 502.2, 551.8

(56) References Cited

U.S. PATENT DOCUMENTS

| | | | | |
|---|---|---|---|---|
| 264,389 A | * | 9/1882 | Wilhelm | |
| 279,565 A | * | 6/1883 | Hunt | |
| 1,716,141 A | * | 6/1929 | Knight | |
| 1,834,724 A | * | 12/1931 | Nisbet | |
| 3,948,361 A | * | 4/1976 | Carlson | 188/265 |
| 3,950,005 A | * | 4/1976 | Patterson | 280/47.31 |
| 4,311,060 A | * | 1/1982 | Kawaguchi et al. | |
| 4,364,283 A | * | 12/1982 | Ricardo | 74/489 |
| 4,653,613 A | * | 3/1987 | Blancas | 188/24.22 |
| 4,862,999 A | * | 9/1989 | Rakover | 188/24.18 |
| 4,966,047 A | * | 10/1990 | Krauer et al. | |
| 5,005,674 A | * | 4/1991 | Piatt | |
| 5,134,897 A | * | 8/1992 | Romano | 74/489 |
| 5,370,017 A | * | 12/1994 | Krauer | 74/489 |
| 5,393,081 A | * | 2/1995 | Mortenson | 280/47.27 |
| 5,437,206 A | * | 8/1995 | Boor | 74/489 |
| 5,682,963 A | * | 11/1997 | Tang | 188/24.22 |
| 5,690,191 A | * | 11/1997 | Burbank | 188/2 D |
| 5,802,927 A | * | 9/1998 | Yu et al. | 74/489 |
| 6,041,895 A | * | 3/2000 | Mao | 188/24.22 |
| 2002/0005619 A1 | * | 1/2002 | Cote | 280/47.31 |

FOREIGN PATENT DOCUMENTS

| | | | |
|---|---|---|---|
| DE | 3336678 | * | 4/1985 |
| DE | 20011568 | * | 11/2000 |
| JP | 11334549 | * | 12/1999 |

* cited by examiner

*Primary Examiner*—Douglas C. Butler
(74) *Attorney, Agent, or Firm*—Risto A Rinne, Jr.

(57) ABSTRACT

An apparatus for the application of a braking force to a wheel of a wheelbarrow, hand cart or other type of a cargo portage device includes a twist grip mechanism with a latching type of a ratchet attached to the handlebar of the device. As the twist grip mechanism is rotated a progressive braking force is applied to the wheel by tightening a brake band that extends around a drum that is attached to the wheel. A cable is attached at one end to the twist grip mechanism and to the brake band at its remaining end. The ratchet maintains the braking force that is applied until a thumb release lever is depressed which disengages a ratchet dog from contact with any of a plurality of ratchet teeth.

13 Claims, 3 Drawing Sheets

TWIST-GRIP BRAKE FOR A CARGO PORTAGE DEVICE

BACKGROUND OF THE INVENTION

1. Field of the Invention

The present invention, in general relates to braking devices for cargo portage devices and, more particularly, to twist grip braking devices for use with wheelbarrows and hand trucks.

The desire to apply a brake to a wheelbarrow or to a handtruck are well known and long-standing needs. These types of cargo portage devices are difficult to control on inclines. In particular, it is difficult to prevent them from running away from an operator.

Therefore, various types of braking devices have been built that function on wheelbarrows and the like. However, these types of braking devices fail to satisfy the need of maintaining control of the cargo portage device at all times.

It is important that the grip upon the handles of the cargo portage device not be compromised at any time, in particular, when using a wheelbarrow. The handles are used to balance the wheelbarrow (i.e., single wheel types of wheelbarrows) and therefore, an operator must always maintain a positive and secure grip on both of the handles.

Similarly, the operator must also always maintain a good grip upon the handles of a handtruck lest it begin to veer away from the operator.

Certain of the known types of braking devices for wheelbarrows use a braking device control portion that is attached to one of the handles and which requires the operator to pull the braking device control portion in a direction away from the wheelbarrow (i.e., toward the rear of the wheelbarrow) in order to actuate the braking mechanism.

This in and out type of "play" lessens the feeling of control for the operator. It is important that the handle feel solid in order for the operator to feel in optimum control of the cargo portage device.

Also, this type of a braking device requires the operator to pull outward on the handle regardless of the attitude of the handle and this is not always easy or even possible to accomplish.

In particular, when a wheelbarrow is being raised for dumping the contents out from it, any of the known types of braking devices become either impractical or impossible to utilize. It is not possible to elevate the handles of a heavily laden wheelbarrow into a fully upright position and then pull outward, which is to lift even higher, the braking device control portion while still maintaining optimum braking control.

Accordingly, there exists today a need for a braking device for wheelbarrows, handtrucks, and other types of cargo portage devices that allows the operator to maintain control over the braking function regardless of the attitude that the cargo portage device is placed in and which maintains a solid feel that appeals to the operator regarding the handles of the cargo portage device.

Clearly, such a braking apparatus would be a useful and desirable device.

2. Description of Prior Art

Brakes for a variety of devices are, in general, known. For example, the following patents describe various types of braking devices:

U.S. Pat. No. 6,041,895 to Mao, Mar. 28, 2000;
U.S. Pat. No. 5,802,927 to Yu et al., Sep. 8, 1998;
U.S. Pat. No. 5,690,191 to Burbank, Nov. 25, 1997;
U.S. Pat. No. 5,393,081 to Mortenson, Feb. 28, 1995;
U.S. Pat. No. 4,962,833 to McCurdy, Oct. 16, 1990;
U.S. Pat. No. 4,767,128 to Terhune, Aug. 30, 1988;
U.S. Pat. No. 4,640,520 to Wing et al., Feb. 3, 1987;
U.S. Pat. No. 4,479,658 to Michaux, Oct. 30, 1984;
U.S. Pat. No. 4,252,334 to Filkins, Feb. 24, 1981;
U.S. Pat. No. 3,950,005 to Patterson, Apr. 13, 1976; and
U.S. Pat. No. 2,716,031 to Roessler, Aug. 23, 1955.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a twist-grip brake for a cargo portage device that can be used to slow down the cargo portage device.

It is also an important object of the invention to provide a twist-grip brake for a cargo portage device that can be used to stop the cargo portage device.

Another object of the invention is to provide a twist-grip brake for a cargo portage device that allows control of the braking function of the cargo portage device without an operator having to alter any part of his grip upon the handle.

Still another object of the invention is to provide a twist-grip brake for a cargo portage device that allows control of the braking function of the cargo portage device without an operator having to pull any component in an outward direction.

Still yet another object of the invention is to provide a twist-grip brake for a cargo portage device that allows control of the braking function of the cargo portage device with a handle that controls the braking function and which provides an operator with a steady, solid feel.

Yet another important object of the invention is to provide a twist-grip brake for a cargo portage device that is adapted to function regardless of the attitude of the cargo portage device.

Yet one further object of the invention is to provide a twist-grip brake for a cargo portage device that is adapted for use with a wheelbarrow.

Yet one still further object of the invention is to provide a twist-grip brake for a cargo portage device that that is adapted for use with a hand truck.

Still yet another important object of the invention is to provide a twist-grip brake for a cargo portage device that is adapted for heavy duty usage.

Still yet a first other important object of the invention is to provide a twist-grip brake for a cargo portage device that is reliable.

Still yet a second other important object of the invention is to provide a twist-grip brake for a cargo portage device that improves safety.

Still yet a third other important object of the invention is to provide a twist-grip brake for a cargo portage device that automatically locks as it is applied.

Still yet a fourth other important object of the invention is to provide a twist-grip brake for a cargo portage device that is adapted for use with a variety of different braking mechanisms, such as drum, disk (i.e. disc), and caliper types of braking mechanisms.

Still yet a fifth other important object of the invention is to provide a twist-grip brake for a cargo portage device that can be locked in a brake applied position as desired.

Still yet a sixth other important object of the invention is to provide a twist-grip brake for a cargo portage device that is free of obstructions that are associated with lever-type brake actuators.

Briefly, a twist-grip brake for a cargo portage device that is constructed in accordance with the principles of the present invention has a brake control mechanism attached to one of the handles that is used to maneuver the cargo portage device. Twisting the grip proportionately actuates a braking mechanism that is attached to at least one wheel of the cargo portage device. A toothed ratchet with a thumb operated release mechanism is used to automatically lock the brake in an applied position and to release it, as desired. One possible type of a band brake is described.

DETAILED DESCRIPTION OF THE INVENTION

Figure 1:
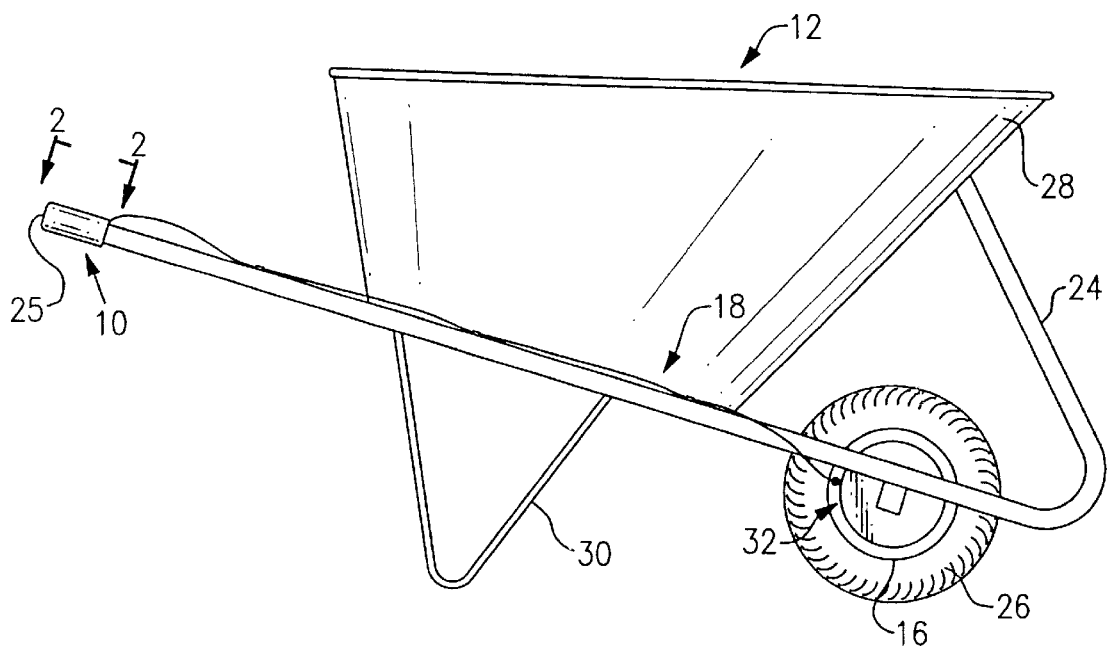
FIG. 1 is a side view of a twist-grip brake for a cargo portage device on a wheelbarrow type of a cargo portage device.

Referring to all of the drawings and in particular now to FIG. 1 is shown, a twist-grip brake for a cargo portage device, identified in general by the reference numeral 10 attached to a wheelbarrow 12.

Figure 1A:
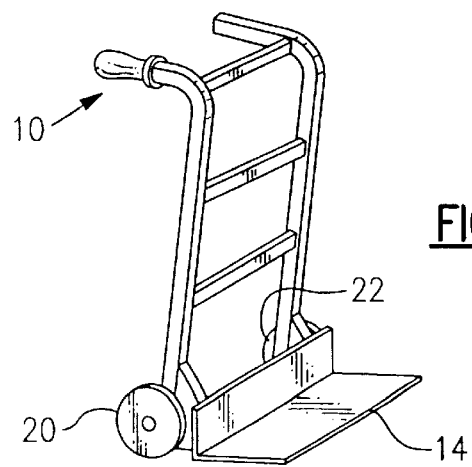
FIG. 1a is a view in perspective of a hand truck type of a cargo portage device.

Referring momentarily to FIG. 1a, the twist-grip brake 10 is attached to a hand cart 14, sometimes also referred to as a handtruck as an alternate type of cargo portage device.

The wheelbarrow 12 includes a single wheel 16. A cable 18 intermediate the twist-grip brake 10 and the wheel 16 is used to actuate the braking mechanism, as is described in greater detail hereinafter.

The hand cart 14 uses a pair of wheels 20, 22, at least one of which must include a braking mechanism. The remaining description is focused in particular on the wheelbarrow 12.

The wheelbarrow 12 includes a tube type of frame structure 24. A first half of the frame structure (as shown) begins proximate the twist-grip brake 10 on the right side of the wheelbarrow 12 at a handlebar 25, extends under one side of the wheelbarrow 12, supports one side of the wheel 16 and a tire 26 and extends up to the top of a tub 28.

A second half of the frame structure (not shown) is disposed behind that portion of the frame structure 24 that is shown on the opposite side of the wheel 16 and together with the first half of the frame structure, provide support for the wheelbarrow 12 with a pair of legs 30 (one shown).

A brake drum 32 is attached to the wheel 16 and extends outward toward the first half of the frame structure 24.

The twist-grip brake 10 could, of course, be modified and disposed on the left side of the wheelbarrow 12 or the hand cart 14, if desired.

Figure 2:
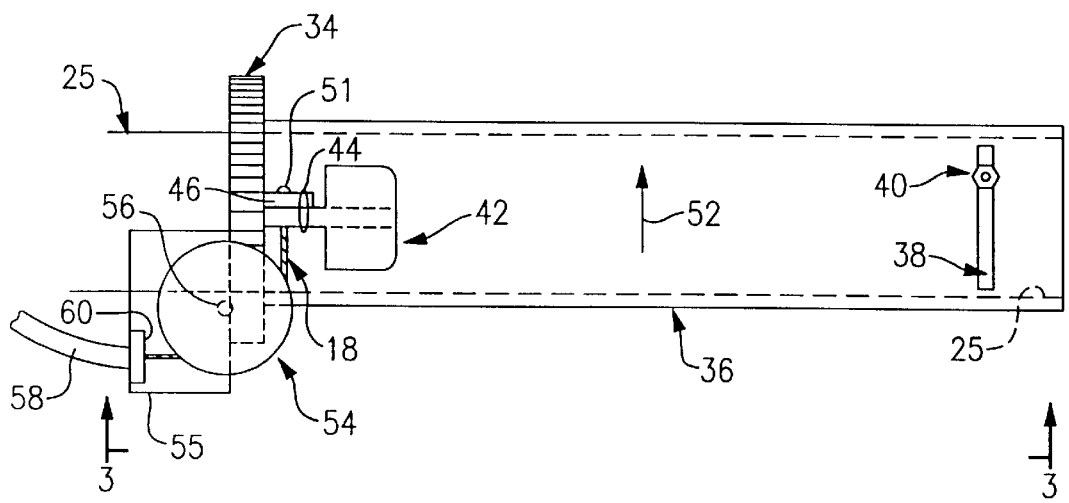
FIG. 2 is a view taken on the line 2—2 in FIG. 1 of the twist-grip brake for a cargo portage device.
Figure 3:
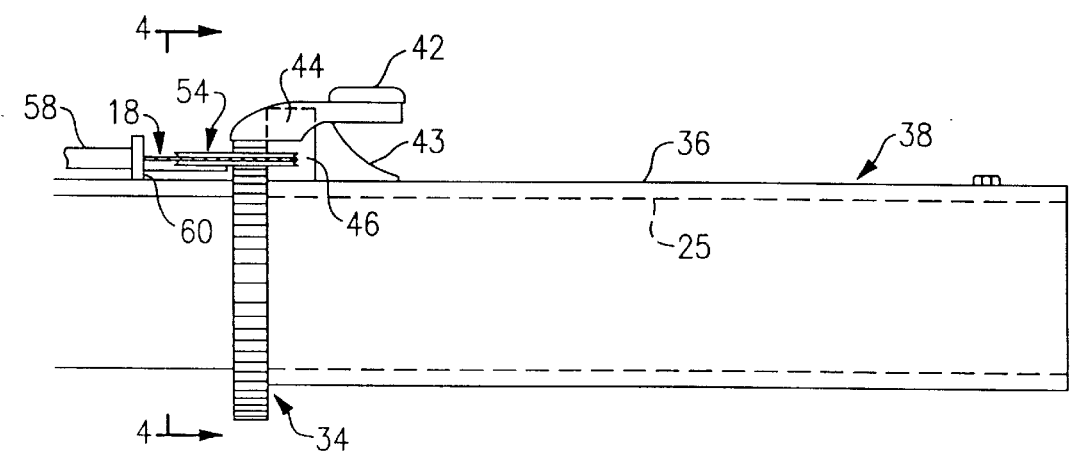
FIG. 3 is a view as shown in FIG. 2 as seen along the lines 3—3 therein.
Figure 4:
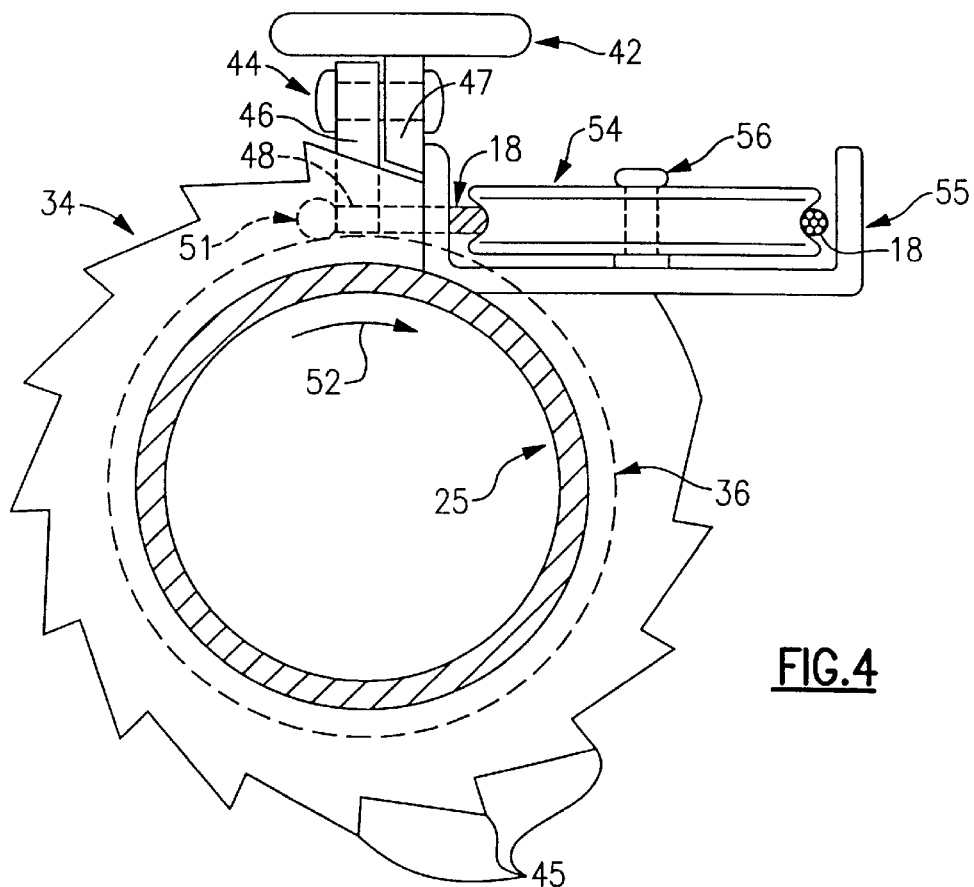
FIG. 4 is an enlarged cross sectional view taken on the line 4—4 in FIG. 3.

Referring now to FIGS. 2–4, a ratchet 34 is attached to the handlebar 25 and is fixed relative to the handlebar 25. A control tube 36 passes over the handlebar 25 and is secured thereto by a slot 38 that is provided in the control tube 36 and a set screw 40 that passes through the slot 38 and is attached by threads to the handlebar 25.

The set screw 40 in the slot 38 limits the range of motion the control tube 36 can be rotated about the handlebar 25 and prevents the control tube 36 from being pulled longitudinally away from the handlebar 25.

During normal use, the control tube 36 rotates in a limited arc about a longitudinal axis that passes through the center of the handlebar 25 proximate its end. Such rotation of the control tube 36 is used to progressively actuate a braking mechanism, as is described in greater detail hereinafter.

A thumb release lever 42 pivots about a pivot pin 44 that passes through a fulcrum member 46, all of which are attached to the control tube 36 and rotate accordingly. A spring 43 intermediate the control tube and the underside of the thumb release lever urges the thumb release lever 42 upward so that a ratchet dog 47 (that is attached to the opposite end of the thumb release lever 42) normally bears against one of a plurality of ratchet teeth 45 (See FIG. 4).

A first end 48 of the cable 18 passes through a hole in the fulcrum member 46 and is retained in position thereto by a cable stop 51.

The fulcrum member 46, as mentioned hereinabove, is attached to the control tube 36 so that it rotates with the control tube 36. The ratchet 34 remains stationary with respect to the handlebar 25 as the control tube 36 is rotated.

Rotation of the control tube 36 in the direction of first arrow 52 pulls the first end 48 of the cable 18 in a direction that is away from a pulley 54. This applies braking to the wheel 16, as is described in greater detail hereinafter.

The pulley 54 is attached to a stationary pulley housing member 55 that is, respectively, attached to the ratchet 34. The pulley 54 rotates about a central axis 56 as the cable 18 is either extended in the direction of the first arrow 52 or when it is retracted in the reverse direction.

The cable 18 passes through a sheath 58 (i.e., a covering, the type of which being well known in the cabling arts) that is secured in position by a sheath retainer 60.

The cable stop 51 prevents the first end 48 of the cable 18 from being pulled through a hole in the fulcrum member 46 when the control tube 36 is rotated in the direction of the first arrow 52.

As the control tube 36 is rotated in the direction of the first arrow 52, the ratchet dog 47 rises up along the incline of each of the ratchet teeth 45 that it passes. The spring 43 compresses and extends as each of the ratchet teeth 45 are passed by the ratchet dog 47.

As the control tube 36 is rotated, the ratchet dog 47 passes over the shoulder of each of the ratchet teeth 45 and it is then urged down past the shoulder by the spring 43.

If rotational force (supplied by an operator, not shown) is now relaxed upon the control tube 36, the ratchet dog 47 will retain the control tube 36 in position and a braking force in proportion to the amount the control tube 36 was rotated will be applied to the brake drum 32.

To release the control tube 36 and cease to apply the braking force, the control tube 36 is (preferably) slightly tightened once again in the direction of the first arrow 52 merely to relax any tension that is present on the ratchet dog 47 as it is in contact with one of the ratchet teeth 45.

The thumb release lever 42 is then depressed by the thumb (not shown) of the operator and it is held in the depressed position. This disengages the ratchet dog 47 from a position of cooperation with any of the ratchet teeth 45.

The control tube 36 is then rotated in a direction opposite that of the first arrow 52 to the degree or extent desired by the operator. The operator may lift his thumb at any time and the ratchet dog 47 will engage another of the ratchet teeth 45 and apply a lesser braking force, or the operator may continue to press his thumb down on the thumb release lever 42 until the control tube 36 is fully rotated in a direction opposite to that of the first arrow 52 and all of the braking effect is removed.

Obviously, the operator may also elect to increase braking force at any time by simply twisting the control tube 36 further in the direction of the first arrow 52. The ratchet dog 47 will engage with other of the ratchet teeth 45 as the control tube 36 is rotated further in the direction of an arc that is defined by the first arrow 52.

Figure 5:
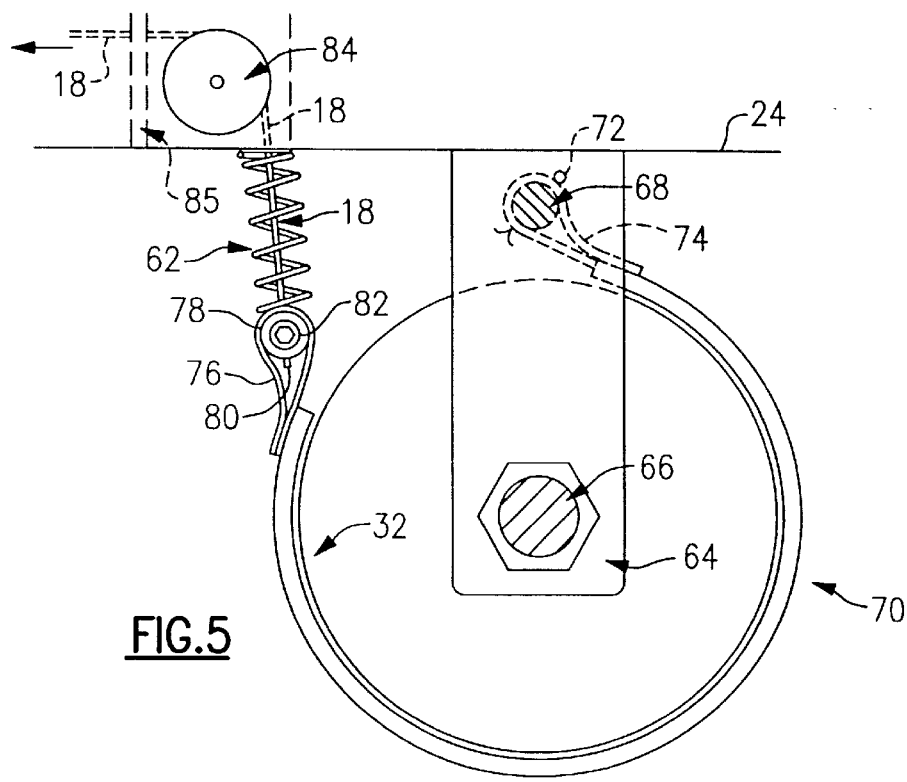
FIG. 5 is a side view of the brake assembly proximate the wheel of the wheelbarrow of FIG. 1.

Referring now to FIG. 5, a second spring 62 urges the control tube 36 in an opposite direction to that of the first arrow 52 to relax the braking force that is applied to the drum 32 by pulling on the cable 18 in an opposite direction, as is described in greater detail hereinafter.

A first wheel support bracket 64 extends down from the frame tube 24 and supports an axle 66. The axle passes through to the other side of the wheelbarrow 12 and is similarly attached to a second wheel support bracket (not shown). The wheel 16 and the tire 26 are disposed about the axle 66 intermediate the first and second wheel support brackets 64. The wheel 16 and the tire 26 are omitted from this view to improve clarity.

A brake band retainer stud 68 is attached to the inside of the first wheel support bracket 64 and it extends inward toward the wheel 16 to a position in alignment with and slightly elevated above the brake drum 32.

If desired, a second bracket (not shown) may be attached to the inside of the first wheel support bracket 64 and the brake band retainer stud 68 may be attached to the second bracket (instead of the to first wheel support bracket 64) to better align a brake band 70 over the drum 32.

A cotter pin 72 is used to secure a first end strap 74 of the brake band 70 to the brake band retainer stud 68.

A second end strap 76 that is disposed at an opposite end of the brake band 70 passes over an end pin 78. The end pin 78 is attached to a second end 80 of the cable 18 and a set screw 82 passes into the end pin 78 and is used to secure the end pin 78 to the second end 80 of the cable 18.

The set screw 82 is also used to adjust the overall length of the cable 18 so that the brake band 70 does not engage (i.e., contact) the brake drum 32 when the control tube 36 is fully retracted in the direction opposite that of the first arrow 52 and also to ensure that it fully contacts the brake drum 32 when the control tube 36 is fully rotated in the direction of the first arrow 52.

A second pulley 84 is disposed in the frame 24 supported by a second pulley housing member 85 and it (i.e., the second pulley 84) is used to change direction of the cable 18 and to guide the cable 18 back toward the twist grip brake 10.

In use, rotating the control tube 36 in the direction of the first arrow 52 pulls the cable 18 and, accordingly, pulls upward on the second end strap 76 of the brake band 70 overcoming the force of the second spring 62. The brake band 70 tightens around the brake drum 32 and proportionately applies increased braking force to the wheel 16 as the control tube 36 is further rotated.

The braking force that is applied to the wheel 16 continues even when the operator relaxes the force that is applied to the control tube 36 because the ratchet dog 47 maintains the control tube 36 proximate the nearest ratchet tooth 45 beyond which it was rotated.

Accordingly, the handlebar 25 of the wheelbarrow 12 can be urged into an upward attitude for dumping of the contents from the tub 28 with full braking being constantly applied to the wheel 16 and without the operator having to apply any force or any twisting or pulling action upon the control tube 36. This allows the operator to focus all of his attention on the dumping operation while maintaining a tight grip with all fingers of the hand (and also the thumb) upon the control tube 36, thereby providing a level of safety and control that, heretobefore, was unattainable.

When braking force is no longer required, tension upon the ratchet dog 47 is relaxed, as was described hereinabove, and the control tube 36 is urged fully into the retracted position in which the ratchet dog 47 is in contact with a side of the stationary pulley housing member 55 by the force applied to the cable 18 and supplied by the second spring 62. The brake band 70 is then urged away from the brake drum 32. No further braking force is then applied to the wheel 16 which is free to rotate about the axle 66.

It is clear that any amount of braking force may be applied to the wheel 16 by progressively applying ever more force to rotate the control tube 36 even further in the direction shown by the first arrow 52.

If the braking force that is to be applied to the wheel 16 is intended to be momentary, then the thumb release lever 42 is maintained in a depressed state as the control tube 36 is rotated in the direction of the first arrow 52 and also when it is allowed to retract in the opposite direction. Maintaining the thumb release lever 42 in a depressed state prevents the ratchet dog 47 from engaging with any of the ratchet teeth 45.

It is noted that the handlebar 25, as shown, refers to that portion of the cargo portage device that the operator normally grasps. In particular the handlebar 25 includes that portion sometimes referred to as a "handgrip" area. The handgrip area normally includes two handgrip areas, each being disposed on two sides of the cargo portage device. The operator normally grasps the handlebar 25 with two hands, one hand disposed at each of the two handgrip areas.

The twist-grip brake for a cargo portage device 10 is normally attached to the handlebar 25 at one of the handgrip areas and, as such, replaces the handgrip area on that side of the cargo portage device 10. For example, if the twist-grip brake for a cargo portage device 10 is used on the right side of the handlebar 25 to replace the right hand side handgrip (perhaps a molded handgrip [not shown] was used), the molded handgrip is removed from the right side of the cargo portage device and the twist-grip brake for a cargo portage device 10 is used to replace it.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A twist-grip brake for a cargo portage device, comprising:

(a) a member adapted for attachment to a handlebar of said cargo portage device, said member adapted for rotation in an arc about a longitudinal axis of said handlebar, said arc extending for a predetermined distance;

(b) means for applying a braking force to a wheel of said cargo portage device; and (c) means for actuating said means for applying a braking force, whereby said means for actuating is adapted to urge said means for applying a braking force subsequent to said member being rotated about said arc;

a ratchet attached to said handlebar, said ratchet disposed in a fixed position relative to said handlebar and including a plurality of teeth, each of said plurality of teeth including a generally saw-tooth profile thereto, and including a thumb release lever attached to said member, said thumb release lever adapted to pivot about an axis and including a portion that is adapted to receive a thumb of an operator disposed on one side of said axis and including a ratchet dog that is disposed on an opposite side of said axis, and wherein said ratchet dog is adapted to engage in a position of cooperation with one of said plurality of teeth when said member is rotated about said arc and wherein said engagement of said ratchet dog with said one of said plurality of teeth is sufficient to retain said member in said position along said arc.

2. The twist-grip brake for a cargo portage device of claim 1 wherein said member includes a control tube, said control tube adapted for placement over a handgrip area of said handlebar.

3. The twist-grip brake for a cargo portage device of claim 1 wherein said means for actuating includes a cable.

4. The twist-grip brake for a cargo portage device of claim 1 wherein said means for applying a braking force includes a brake mechanism attached to said wheel.

5. The twist-grip brake for a cargo portage device of claim 4 wherein said brake mechanism includes a drum brake.

6. The twist-grip brake for a cargo portage device of claim 4 wherein said brake mechanism is adapted to apply a braking force proportionate to an amount said member is rotated about said arc.

7. The twist-grip brake for a cargo portage device of claim 1 including means for maintaining a braking force applied to said wheel.

8. The twist-grip brake for a cargo portage device of claim 7 wherein said means for maintaining includes means for releasing said braking force applied to said wheel.

9. The twist-grip brake for a cargo portage device of claim 7 including a brake mechanism attached to said wheel and wherein said brake mechanism is adapted to apply a braking force proportionate to an amount said member is rotated about said arc and wherein said means for maintaining is adapted to maintain said braking force in accordance with said amount said member is rotated.

10. The twist-grip brake for a cargo portage device of claim 1 wherein said ratchet dog is adapted to disengage from said position of cooperation with said one of said plurality of teeth subsequent to said thumb of said operator depressing said portion that is adapted to receive the thumb of an operator.

11. A twist-grip brake for a cargo portage device, comprising:

(a) a member adapted for attachment to a handlebar of said cargo portage device, said member adapted for rotation in an arc about a longitudinal axis of said handlebar, said arc extending for a predetermined distance;

(b) a ratchet attached to said handlebar, said ratchet disposed in a fixed position relative to said handlebar and including a plurality of teeth, each of said plurality of teeth including a generally saw-tooth profile thereto, and including a thumb release lever attached to said member, said thumb release lever adapted to pivot about an axis and including a portion that is adapted to receive a thumb of an operator disposed on one side of said axis and including a ratchet dog that is disposed on an opposite side of said axis, and wherein said ratchet dog is adapted to engage in a position of cooperation with one of said plurality of teeth when said member is rotated about said arc and wherein said engagement of said ratchet dog with said one of said plurality of teeth is sufficient to retain said member in said position along said arc;

(b) means for applying a braking force to a wheel of said cargo portage device; and (c) means for actuating said means for applying a braking force wherein said means for actuating a braking force includes a cable, said cable attached at one end thereof to said means for applying a braking force and wherein said cable is attached at an opposite end to said member, whereby said cable is adapted to urge said means for applying a braking force subsequent to said member being rotated about said arc.

12. The twist-grip brake for a cargo portage device of claim 11 wherein said ratchet dog is adapted to disengage from said position of cooperation with said one of said plurality of teeth subsequent to said thumb of said operator depressing said portion that is adapted to receive the thumb of an operator.

13. The twist-grip brake for a cargo portage device of claim 11 wherein said means for applying a braking force to a wheel of said cargo portage device includes a drum attached to said wheel and a brake band that is attached to a portion of a frame of said cargo portage device at one end thereof and wherein said brake band is attached at a remaining end thereof to said one end thereof of said cable, and wherein said brake band is adapted to encircle a portion of said drum, whereby when said member is rotated in a first direction about said arc, said brake band is adapted to apply a pressure upon said drum in proportion to the amount said member is rotated.

* * * * *